(12) United States Patent
Ackerman et al.

(10) Patent No.: US 9,038,134 B1
(45) Date of Patent: May 19, 2015

(54) MANAGING PREDICTIONS IN DATA SECURITY SYSTEMS

(71) Applicant: EMC Corporation, Hopkinton, MA (US)

(72) Inventors: Karl Ackerman, Topsfield, MA (US); Yedidya Dotan, Newton, MA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 6 days.

(21) Appl. No.: 13/731,430

(22) Filed: Dec. 31, 2012

(51) Int. Cl.
*H04L 9/32* (2006.01)
*H04L 29/06* (2006.01)

(52) U.S. Cl.
CPC .................................... *H04L 63/08* (2013.01)

(58) Field of Classification Search
CPC ..... H04L 63/08; H04L 63/0861; H04L 63/10; H04L 63/101; H04L 63/102; G06F 21/31; G06F 21/316; G06F 21/32; G06F 21/62; G06F 21/50

USPC ........... 726/26–30, 1–10; 713/168–170, 172, 713/186, 189, 192–194; 709/223–225, 229
See application file for complete search history.

(56) References Cited

U.S. PATENT DOCUMENTS

| | | | |
|---|---|---|---|
| 7,774,294 B2 * | 8/2010 | Aravamudan et al. | 706/62 |
| 8,108,406 B2 * | 1/2012 | Kenedy et al. | 707/749 |
| 8,225,102 B1 * | 7/2012 | Palmer et al. | 713/183 |
| 8,397,302 B2 * | 3/2013 | Mont et al. | 726/25 |
| 2013/0061285 A1 * | 3/2013 | Donfried et al. | 726/3 |

\* cited by examiner

*Primary Examiner* — Hosuk Song
(74) *Attorney, Agent, or Firm* — Krishnendu Gupta; Jason A. Reyes

(57) ABSTRACT

A. method is used in managing predictions in data security systems. An authentication request is received from an entity for access to a computerized resource. A predictor is determined based on context data for the authentication request and the entity. The authentication request is managed based on the predictor and the context data.

2 Claims, 1 Drawing Sheet

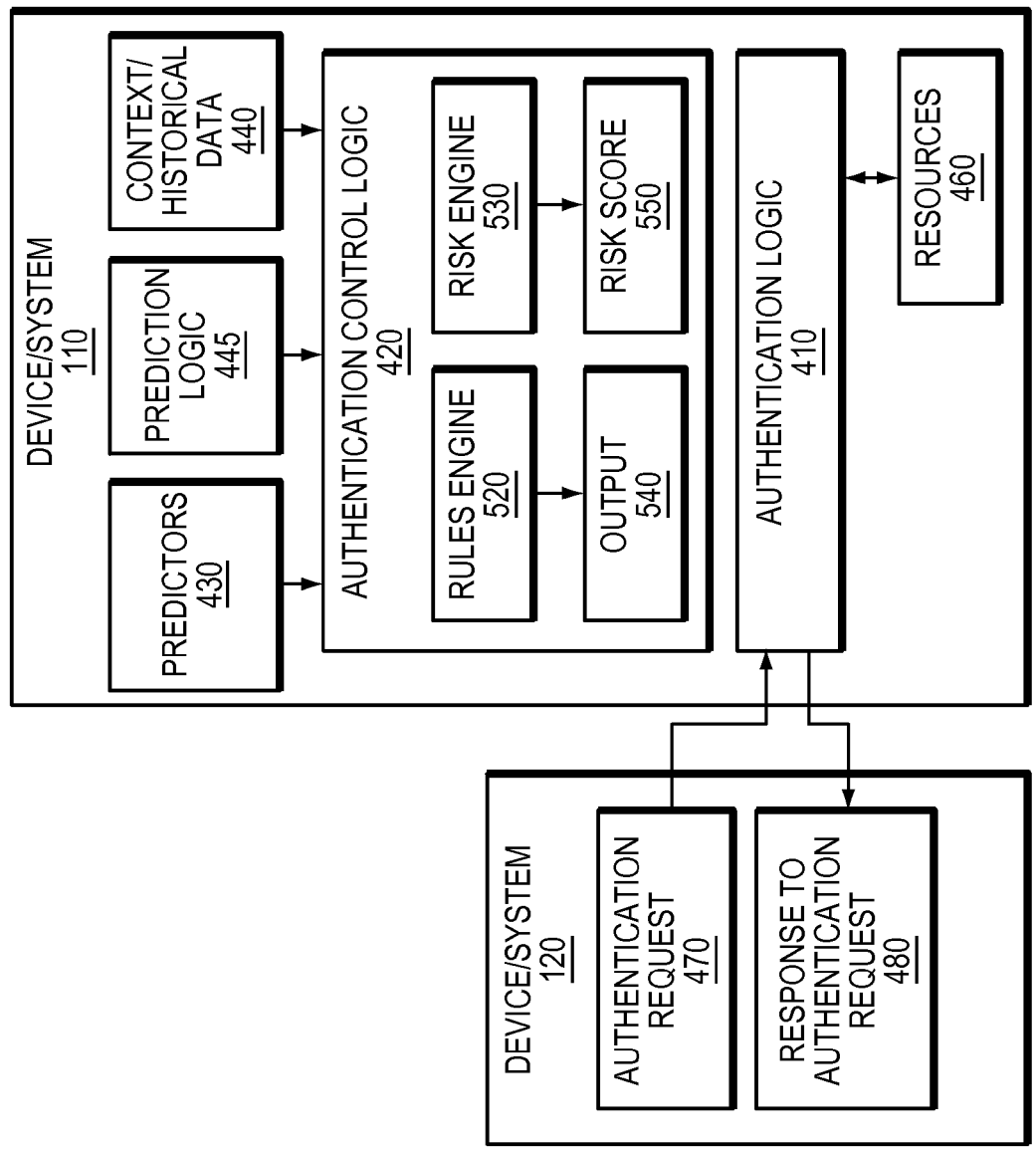

MANAGING PREDICTIONS IN DATA SECURITY SYSTEMS

The present invention relates to managing predictions in data security systems.

BACKGROUND OF THE INVENTION

Generally, security systems employ an identity-based authentication scheme to verify the identity of an entity before granting access to a computer system or a computerized resource. One goal of such security systems is to accurately determine identity so that an unauthorized party cannot gain access. Security systems can use one or more of several factors, alone or in combination, to authenticate entities. For example, security systems can be based on something that the entity knows, something the entity is or something that the entity has.

Examples of something an entity knows are a code word, password, personal identification number ("PIN") and the like. Examples of something the entity is include a distinct characteristic or attribute known as a biometric. An example of something an entity possesses is a physical or digital object, referred to generally as a token, that is unique, or relatively unique, to the user.

Computer-based event probability prediction systems traditionally use some amount of historical information, a profile, about individual objects in order to compare present behavior with past behavior. Each of these objects is defined to be an entity, while a set of similar objects is defined to be an entity class. Examples of events to predict include whether or not a loan applicant will default on a loan and whether or not a credit card transaction is fraudulent. Examples of entities include a particular customer account at a bank and a particular Automatic Teller Machine (ATM).

To achieve high performance, an event probability prediction system often includes a mathematical model or combination of models which extracts patterns from historical data and uses the patterns on the present transaction data to calculate a score, a number that represents the likelihood that a particular event will occur.

SUMMARY OF THE INVENTION

A. method is used in managing predictions in data security systems. An authentication request is received from an entity for access to a computerized resource. A predictor is determined based on context data for the authentication request and the entity. The authentication request is managed based on the predictor and the context data.

BRIEF DESCRIPTION OF THE DRAWINGS

Features and advantages of the present invention will become more apparent from the following detailed description of exemplary embodiments thereof taken in conjunction with the accompanying drawings in which:

FIG. 1 is a block diagram showing a computerized system that may be used with the technique described herein.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is disclosed herein a technique for use in managing predictions in data security systems. Human behavior and actions taken can often be anticipated from what happened prior to the action. In today's electronic world individuals are constantly being presented with information and taking actions that can be used to predict future actions. By analyzing the information presented to the individual, historic actions, environment and external influences it is possible to create a prediction of the user's likely future actions. The prediction can be taken into account to better understand whether or not subsequently observed activity is expected or not. Where predictors are present that indicate the action is likely the risk that the end user is being impersonated by an outsider is lower than when these predictors are not present.

Conventionally, major life events are currently used in advertising and marketing campaigns. For example, new owners tend to experience a flood of junk mail when buying a new house or car. These conventional systems use basic signals to determine whether a person is more or less likely to be interested in the products being offered. Conventional risk analytics engines take into account past behavior by monitoring the user's or group of user's historic behavior and detecting deviation from that behavior on an individual or group level.

By contrast, an access control system or authorization system making use of the technique described herein can take into account potential causes for an activity and avoid flagging the activity as risky if the system is able to predict from other data what a normal activity would be, and therefore avoid relying solely on looking at historical data and using that to determine normal activity.

In a first example use case in accordance with the technique described herein, with respect to a user being under investigation, a criminal investigation or a human relations write-up may lead to sudden changes in activity with respect to, e.g., a user's behavior, email deletions, and/or requests to change corporate systems. A system using the technique described herein can be used to help prevent or warn of this activity, even when the user's access rights have not yet been changed, and the privilege is otherwise available.

In a second example use case in accordance with the technique described herein, with respect to bad weather, a predicted hurricane or blizzard, for example, may change an individual's short term purchase patterns, and may also result in an increase in users attempting to work from home, and with this prediction these activities may not need to be flagged as especially risky.

In a third example use case in accordance with the technique described herein, with respect to purchase behavior influences, in many cases, certain purchase behaviors are tied to major life events. For example, a person who was just married and bought a house may be predicted to be looking at activities such as making major purchases and potentially booking a honeymoon in a foreign country. In view of the events, these activities are lower risk than if the events were not present. Making transaction monitoring aware of these major predictors enables a better risk identification engine.

In a fourth example use case in accordance with the technique described herein, with respect to access to confidential data, an access control and security information and event management (SIEM) system can detect that an individual is accessing confidential information, and can take as an input whether this is an expected behavior. Historically the individual may have never accessed the information before and, if so, solely based on historical activity the event should be flagged as suspicious. With a predictive system in accordance with the technique described herein, the access can be determined to be lower risk, if monitored events predicted the access. For example, analysis of an email may identify that the user was recently contacted by the user's manager and asked to perform a financial analysis of a product line the user is not normally associated with. When the user attempts to access restricted financial data, the prediction logic of the system is aware that the user's manager was asking about "financial data" and a specific product earlier in the day, and therefore the access activity may be determined to be less suspicious than it would be in the case of no causal event found.

Depending on the implementation, configuration changes based on the predictive behavior input may be automated, and/or a simple system may set up rules for how access controls systems should be modified.

If a hurricane is predicted, the system may enable users for remote access by issuing emergency access authentication credentials to users in the expected affected location.

If a human resources warning is given, the system may change the user's privileges to restrict the user's ability to re-image the user's computer and delete emails.

If a home purchase is detected, the system may lower an assessment of the risk associated with appliance purchases A rules based system may be implemented, and in at least some cases requires human expertise to learn how behaviors change given an identified predictor. Another approach leverages a machine learning engine that can understand behavior predictors, and monitors a broad user population to help determine what a typical user does once a predictor has been identified. The system learns how users behave and from this can understand what normal future behavior is. Once the system learns expected future behavior for a given predictor, experts can determine whether the future behavior should result in a change as to how existing access control systems should facilitate normal authorized behavior and how to restrict privileges if the expected behavior may be undesirable.

FIG. 1 illustrates an example implementation in which device/system 120 issues an authentication request 470 to device/system 110 and receives a response to authentication request 480. At device 110, authentication logic 410 receives request 470 and, after some processing at device 110, issues response 480.

In the implementation of FIG. 1, logic 410 determines whether and/or how to authenticate based on authentication control logic 420 and, as needed, resources 460 such as a user database and/or software. As described below, logic 420 helps drive logic 410 based on predictors 430 and/or context/historical data 440. Logic 420 may be driven by, for example, rules, conditions, and/or filters, and data 440 may include data indicating time, location, access and/or request history, other activities, and/or other information.

In an example, logic 420 may or may not grant logic 410 permission to authenticate depending on request-related time of day or location data of data 440, and/or on whether request 470 relates to any of predictors 430 such as predictors pertaining to location and time of day.

Depending on the implementation, logic 420 may have rules engine 520 that produces output 540, and/or risk engine 530 that produces risk score 550.

For example, predictors 430 may include rules and/or policies enforced by engine 520 based on data 440. Such rules may require output 540 to indicate grant or denial of request 470 depending on the location of the requestor, the time of day, and/or the authentication history of the user or users that are the subject of the request, as indicated by data 440.

In another example, logic 420 may also weigh risk factors used by engine 530 to produce risk score 550. Based on predictors 430, such factors may require score 550 to indicate a lower or higher risk depending on the location of the requestor, the time of day, and/or the access history of the user or users that are the subject of the request, as indicated by data 440.

In another example, logic 420 may also depend on rules enforced by engine 520 based on data 440, and may include predictor-based weighting of risk factors used by engine 530 to produce risk score 550, wherein score 550 is an input to engine 520. In such example, based on predictors 430, output 540 may indicate that request 470 should be completely or partially denied or granted at least in part because score 550 indicates excessive risk or acceptable risk, respectively.

In a specific implementation, system 110 has prediction logic 445 that derives predictors 430 from data 440. Depending on the implementation, logic 445 may have an approach to predicting occurrences of future events that uses rule-based methods. In such an approach, "positive" and "negative" data sets may be created using windows that precede a target event and windows that do not, respectively. Frequent patterns of unordered events are discovered separately in both data sets and confidence-ranked collections of positive-class and negative-class patterns are used to generate classification rules.

Another rule-based method, referred to as a genetic algorithm-based approach, may be used by logic 445 to predict events, and begins by defining "predictive patterns" as sequences of events with some temporal constraints between connected events. A genetic approach is then used to identify a diverse set of predictive patterns, where a disjunction of such patterns constitutes the classification rules.

Yet another rule-based method that may be used by logic 445 learns multiple sequence generation rules to infer properties, in the form of rules, about future events.

In general, logic 445 may use predictive models to characterize and derive predictors 430 for complex situations and systems. A predictive model is generally a representation of a system or process that receives input data or parameters (such as those related to a system or model attribute and/or external circumstances or environments) and generates output indicative of the behavior of the system or process under those parameters. In other words, the model or models may be used to predict the behavior or trends of the system or process based upon previously acquired data.

One or more of systems 110, 120 may include a controller that includes a processor which takes the form of, but is not limited to, Intel or AMD-based MPUs, and can include a single or multi-cores each running single or multiple threads. The processor may be coupled to a memory and includes risk score engine 530 constructed and arranged to assign risk score 550 to request 470 based on at least context data 440.

At this point, it should be understood that the controller is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product is capable of delivering all or portions of the software. A computer program product of one or more of systems 110, 120 has a non-transitory (or non volatile) computer readable medium which stores a set of instructions which controls one or more controller operations. Examples of suitable computer readable storage media include tangible articles of manufacture and apparatus which store instructions in a non volatile manner such as CD ROM, flash memory, disk memory, tape memory, and the like.

In at least some embodiments, system 120 may communicate with system 110 over any of a plurality of communication media. It will be appreciated that various media may be considered by system 110 to be more or less risky. For example, a network route to system 110 that traverses the Internet before arriving at system 110 may cause engine 530 to modify a transaction risk score up or down accordingly.

The technique may include using an authentication history in connection with the request 470. The history may include a record of discrete occurrences when such requests have been made over a period of time.

The technique may include performing an analysis between context data 440 of request 470 and a history in connection with system 120. For example, engine 530 performs an analysis between data 440 and the history based on previous requests from system 120 stored in the database.

The technique generates score 550, output 540, and/or response 480 based on an analysis between data 440 of request 470, predictors 430, and the history in connection with engine 520. It will be appreciated that score 550, output 540, and/or response 480 can be used for authenticating the user. The authentication result may be based on score 550 based on at least one risk factor. It will be appreciated that in this embodiment the result of the analysis between data 440 of the request and the history is one factor. Risk score 550 may form part of the response 480 sent to system 120 via the communications medium. In one embodiment, risk score 550 enables granting or denying access or authentication in response to the risk score exceeding or not exceeding a predefined threshold.

It will be appreciated by those skilled in the art that the risk score generated by the risk engine may be based on a set of Bayesian weights each of which corresponds to data 440 in connection with request 470.

It will be appreciated that during operation the technique can perform an analysis of request 470 and data 440 with respect to a particular time. It will also be appreciated that request 470 and/or data 440 may have a timestamp associated therewith enabling analysis by engine 530 with the history at that particular time. The risk engine 530 generates risk score 550 based on the analysis.

Additionally, it will be appreciated that system 110 may be configured to infer patterns of time and location. For example, it will be appreciated that the time and location may frequently correspond enabling the risk engine to identify patterns of behavior and use these patterns together with predictors 430. In this way, the risk engine will be able to use such information when generating a risk score.

Moreover, it will be appreciated that system 110 may be configured to infer at least some of context data 440. For example, if a user is located in a certain location at 09.00 hours to 17.00 hours it can be determined by the risk engine that the user is at work and a risk score is generated accordingly.

Furthermore, it will be appreciated that system 110 may be configured to extract information from context data 440 in order to further challenge the user. For example, if the current location is determined to be a location at work the user may be further challenged with a question such as "what is the name of your employer?"

Moreover, it will be appreciated that an authentication server may be configured to include a user profile which may be combined with or form part of context data 440 in connection with request 470. For example, if the user has never left the U.S.A., and there are no predictors 430 indicating such travel, the aforementioned travel detail with respect to the user may be included in the user profile meaning that if the current location of request 470 is in Europe the risk engine will be configured to generate a much higher risk score.

Furthermore, the system may be configured for recognizing that certain context data 440, e.g., pertaining to certain locations, may lead to predictors 430 indicating a greater threat. For example, it will be appreciated that certain countries, or areas within a metropolitan area, may be treated as being of greater threat than others. The risk engine may be configured to take this into account when generating a risk score. In addition, it will be appreciated that certain countries or areas within a metropolitan area may be transiently subject to additional risk factors. For example, a temporary influx of people may be expected in an area due to a large sporting event, concert or the like, and this may be reflected in predictors 430.

In another example, the risk engine may have access to a user's travel booking information. If the booking information shows that the user should be traveling to a new destination city, the system takes that information into account as a predictor for an access attempt from near the destination city on the dates of travel.

Also, if the user is expected to be traveling but severe weather has been predicted in either his departure or connecting destination airports immediately prior to or during the user's flight, the system can take that weather information into account as an indicator that the chance of a valid authentication attempt from the destination area is lower, as the flight may be canceled.

A direct feed from a travel alert provider may inform the system whether a flight has been canceled or delayed.

In another example, the system and risk engine may be used to help handle users during a company conference that is being held in a location that is different from the company's usual locations. Conventionally, authentication attempts from the first users who arrive at the conference may be treated as high risk because the attempts are being made from a location that is unfamiliar to the system, but authentication attempts from users who arrive later are not so treated, because by then an acceptable historic pattern had been established by the first users. By contrast, by use of the system based on the technique described herein, if the system has access to the travel plans for the users and/or to an attendee list for the conference, authentication attempts for even the early arrivals may not be treated as high risk.

With respect to system 110, system 110 may be, include, or be included in a server, storage device, etc., that has a physical communications port for making a connection to a physical security device (PSD) (e.g., smart token) which may form at least a portion of system 110. The computerized system also has an interface to a communications link for communicating with a user, such as a system administrator, operator, technician, etc.

With respect to risk engine 530, the risk engine of a risk-based authentication system may assign risk scores to requests or proposed transactions where higher risk scores indicate higher risk.

In generating a risk score, the risk engine takes, as input values, various attributes (e.g., time of receipt, IP address), of data 440. For each user, e.g., each customer of an online bank, there is an associated history based on values of the transaction attributes associated with previous transactions involving that user, as well as predictors 430. The risk engine incorporates the history and predictors 430 associated with the user into an evaluation of the risk score. Depending on predictors 430, significant variation of one or more attribute values from those in the user's history may signify that the transaction has a high risk.

In an example, a particular customer historically submitted transaction requests to the online bank at 3:00 PM from a particular internet service provider (ISP), and, under the customer's identifier, a user submits a new transaction request at 2:00 AM from a different ISP. The different ISP give rise to a different IP address than that historically associated with the particular customer. In this case, absent predictors, 430, owing to the different IP address and the unusual time that the transaction was submitted, the risk engine may assign a larger risk score to a transaction resulting from the new transaction request. However, if the new transaction request is indicated as predicted by predictors 430 based on other data 440 about the customer, the risk engine may not assign the larger risk score.

Risk engine 530 may be constructed and arranged to assign a risk score to a transaction or request based on values of attributes of previous transactions or requests of data 440 and predictors 430.

Risk engine 530 may execute instructions to access the attribute values from data 440 as well as predictors 430 and assigns risk score 550 to request 470. In some arrangements, the risk score is based on a set of Bayesian weights, each of which corresponds to an attribute or predictor associated with request 470. Risk engine 530 may derive the value of each Bayesian weight from values of the attribute to which the Bayesian weight corresponds for previous requests which may be stored in resources 460.

While various embodiments of the invention have been particularly shown and described, those skilled in the art will know that various changes in form and details may be made therein without departing from the spirit and scope of the invention as defined by the appended claims.

What is claimed is:

1. A method for use in managing predictions in data security systems, the method comprising:
   receiving an authentication request from an entity for access to a computerized resource, wherein the authentication request relates to a historically risky activity;
   detecting an event in connection with the entity;
   based on the detected event, determining that the authentication request is not risky at a particular time; and
   in response to determining that the authentication request is not risky at a particular time, managing the authentication request.

2. A system for use in managing predictions in data security systems, the system comprising:
   a processor and memory;
   the system configured to:
   receiving an authentication request from an entity for access to a computerized resource, wherein the authentication request relates to a historically risky activity;
   detecting an event in connection with the entity;
   based on the detected event, determining that the authentication request is not risky at a particular time; and
   in response to determining that the authentication request is not risky at a particular time, managing the authentication request.

* * * * *